(12) United States Patent
Dockweiler et al.

(10) Patent No.: US 6,252,591 B1
(45) Date of Patent: *Jun. 26, 2001

(54) METHOD FOR MAPPING A TEXT-ORIENTED USER INTERFACE TO A GRAPHICS USER INTERFACE BY MEANS OF A CLASS LIBRARY

(75) Inventors: Hans Gunter Dockweiler, Sindelfingen; Joachim Weber, Boblingen, both of (DE)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,688

(22) Filed: Jun. 18, 1998

(30) Foreign Application Priority Data

Oct. 10, 1997 (DE) .............................................. 197 44 719

(51) Int. Cl.[7] .................................................... G06F 13/00
(52) U.S. Cl. ........................... 345/335; 345/357; 345/329
(58) Field of Search ...................................... 345/326, 339, 345/333, 329, 335, 357, 334; 395/500.47, 500.45, 705, 527

(56) References Cited

U.S. PATENT DOCUMENTS

| | | | |
|---|---|---|---|
| 5,767,851 | * 6/1998 | Yee et al. ............................ | 345/346 |
| 5,812,864 | * 9/1998 | McCoy et al. ....................... | 395/500 |
| 5,819,067 | * 10/1998 | Lynch .................................. | 395/500 |
| 5,884,097 | * 3/1999 | Li et al. ............................... | 710/43 |
| 5,896,522 | * 4/1999 | Ward et al. .......................... | 395/500 |
| 5,911,070 | * 6/1999 | Solton et al. ........................ | 395/701 |
| 5,912,669 | * 6/1999 | Hsia .................................... | 345/357 |
| 5,923,878 | * 7/1999 | Marsland ............................. | 395/704 |
| 6,014,702 | * 1/2000 | King et al. .......................... | 709/227 |

OTHER PUBLICATIONS

Goldberg, Michael, "Sterling gives legacy apps Internet access," Computerworld, pp. 1–2, Apr. 8, 1996.*

Cox, John, "Tools venders marrying the Web with existing applications," Network World, vol. 13, pp. 1–3, Apr. 1, 1996.*

* cited by examiner

*Primary Examiner*—Raymond J. Bayerl
*Assistant Examiner*—Todesse Hailu
(74) *Attorney, Agent, or Firm*—A. Bruce Clay; Myers, Bigel, Sibley & Sajovec, P.A.

(57) ABSTRACT

Methods, systems and computer program products are provided for mapping a text-oriented user interface to a graphics user interface by automatically altering properties of control elements of a standard Java class library based on changes in the text-oriented user interface so as to dynamically react to changes in the text-oriented user interface to provide an extended Java class library. A graphics user interface corresponding to the text-oriented user interface may then be generated utilizing the extended Java class library so that the graphics user interface automatically reflects the changes in the text-oriented user interface.

9 Claims, 3 Drawing Sheets

FIG. 4B
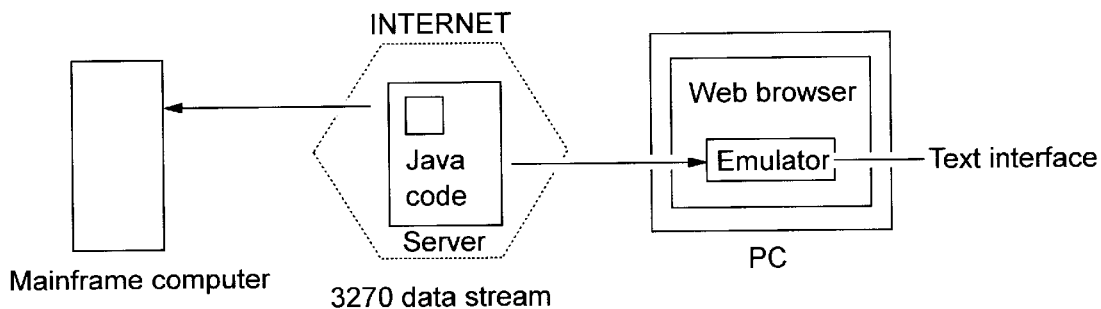
FIG. 4C
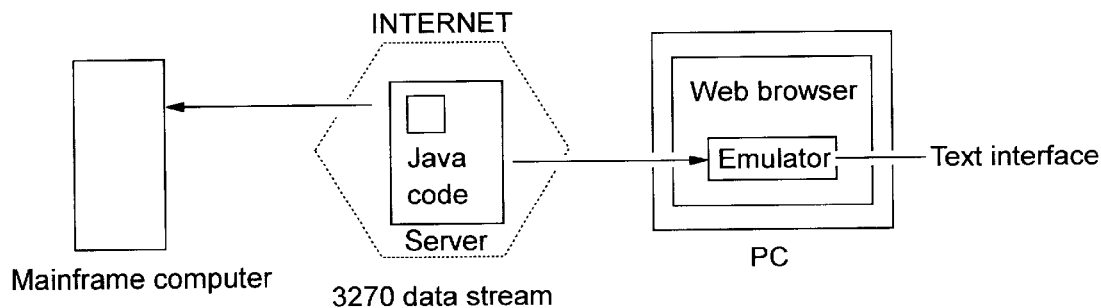
FIG. 5A
```
                        Mask title
    Input 1 Hugo_____
    Input 2 Yes____ (Yes/No)
         ENTER = Process    PF1 = Help    PF3 = Abort
```

METHOD FOR MAPPING A TEXT-ORIENTED USER INTERFACE TO A GRAPHICS USER INTERFACE BY MEANS OF A CLASS LIBRARY

The present invention relates to a method for mapping a text-oriented user interface of a program to a graphics user interface without having to amend the program itself where the graphics user interface can be started from a network environment.

At the present time there is a very large number of mainframe computer applications which are distinguished by matured functionality, robustness, security and high flexibility. These applications communicate with their users through a text-oriented interface. The application exchanges a data stream which corresponds with the contents of the screen with a terminal and formatted by the terminal is used as a screen mask by the user using a keyboard. For the implementation of the data stream which is exchanged between the mainframe computer and the terminal there are various architectures, the most widespread of which is IBM's 3270 architecture. The IBM 3270 architecture is hereinafter used to represent all other architectures. FIG. 1 shows this type of user interface.

With the introduction of PCs, however, it has become necessary to make the 3270 interface available to these PCs. For this purpose software programs have been developed which emulate the traditional terminal in a PC window. The interface in this emulator window is still text oriented and operable through the keyboard, since the emulator is limited to reproducing the capabilities of a terminal.

FIG. 2 shows this type of user interface.

Since a PC with a graphics user interface offers very much greater user-friendliness, it is desirable to provide mainframe applications also with such a graphics user interface. The most economical approach to this is so-called face-lifting or screen-scraping. For this, the application including its 3270 interface remains unaltered. PC windows are only defined for each screen mask which the graphics interface offers the user and accesses the 3270 data stream for the application page and thus represents input and output values between the fields of the screen mask and the graphics elements of the PC window. Instead of the emulator window, which is no longer in evidence, the user interacts with the PC graphics interface. FIG. 3 shows this type of user interface.

The interface described in FIG. 2 can be transferred in an Internet/Intranet environment. The mainframe computer takes over the role of a web-server and the 3270 emulator runs within a web browser. The communications protocol between the mainframe computer and emulator is TCP/IP and the emulator is implemented in Java (to enable it to run independent of the operating system and within a web browser).

At the present time there is no effective method for transferring the above-described process to the Internet/Intranet environment, in order to place a graphics interface on the 3270 interface in this (web browser) environment.

It is therefore the object of the present invention to provide such a method, which is capable-of representing a text-oriented user interface through a graphics user interface, which can be started without problem from a network environment without the necessity for alterations to the existing application.

This object is achieved by the features in claims 1 and 10. Preferred embodiments of the present invention are set out in the sub-claims.

The development tool can be used to produce a graphics mask quickly and simply for each individual text-oriented mask. The graphics masks thus produced can be stored on an Internet/Intranet server and made accessible to specified user groups either free or for a fee. In this case the user may download the masks produced to the working memory of his PC and use them there. This has the advantage that changes in the graphics masks require to be made only on the server. In this way it becomes unnecessary to distribute the software for the amended application to numerous PCs.

A further advantage of the present invention resides in the fact that the programming of the graphics mask is so simple that the code can also be generated automatically if the PC window has been defined by means of a graphics tool, which permits it to access the window definition through a programmed interface.

The present invention will be described by means of an example of a preferred embodiment, where FIG. 1 shows a mainframe computer with a text-oriented application which communicates with a terminal through a text-oriented user interface.(state of the art), FIG. 2 shows a mainframe computer with a text-oriented application which communicates with a PC through an emulation program which generates a textual user interface on the PC (state of the art), FIG. 3 shows a mainframe computer with a text-oriented application which communicates with a PC through an emulation program and a face-lifting tool which generates a graphics user interface on the PC (state of the art), FIG. 4a shows an implementation of the process in accordance with the invention in a network, where a text-oriented application is installed on a mainframe computer and where this application communicates through an emulation program and a client's graphics user interface (PC or network station) which can be loaded from a server on the network to a client.

By FIG. 5a shows a text-oriented screen mask which should map a graphics screen mask by means of the process in accordance with the invention.

Figure 1:
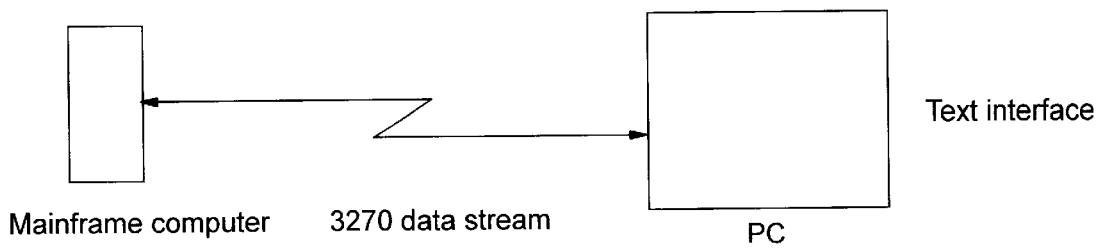
Figure 2:
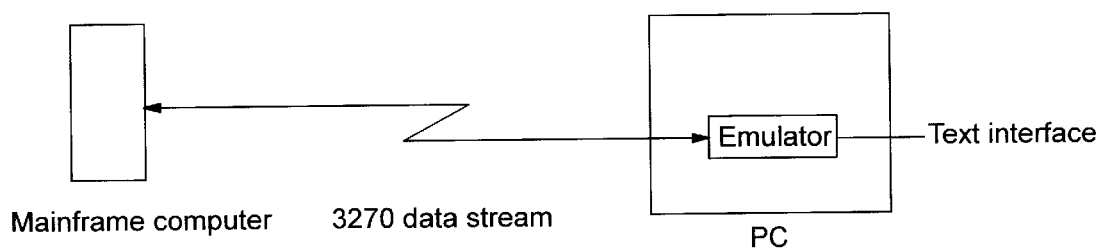
Figure 3:
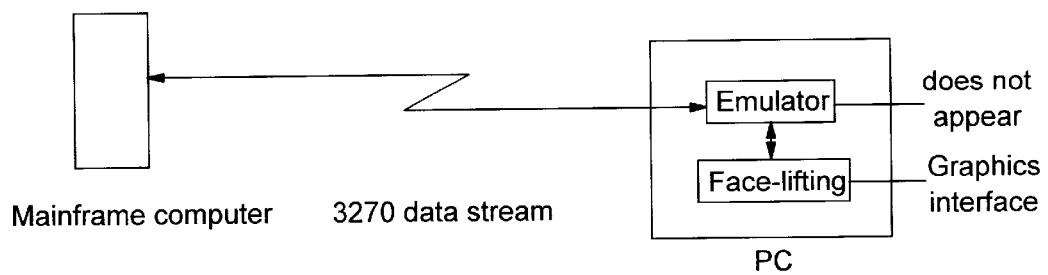
Figure 4A:
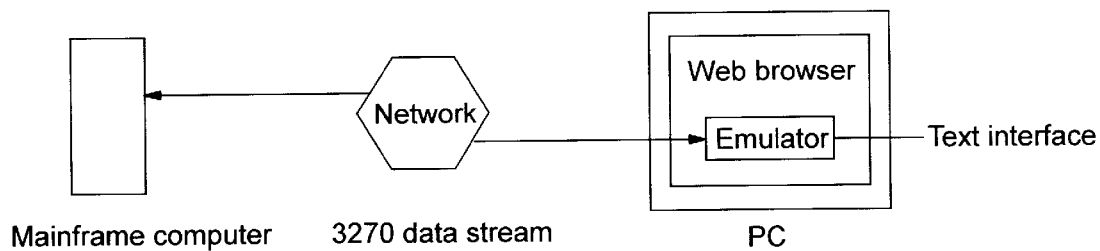
FIG. 4b shows a special environment of FIG. 4a where the environment is an Internet environment.
FIG. 4c shows a further special environment of FIG. 4a, where the environment is an Intranet environment.
Figure 5B:
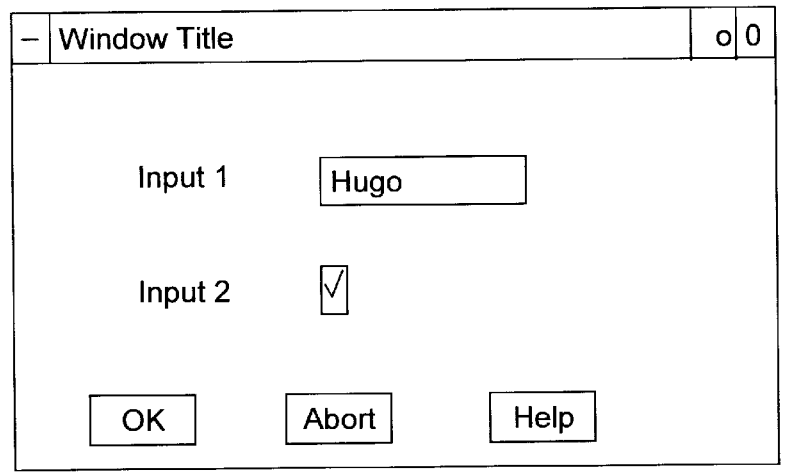
Figure 6:
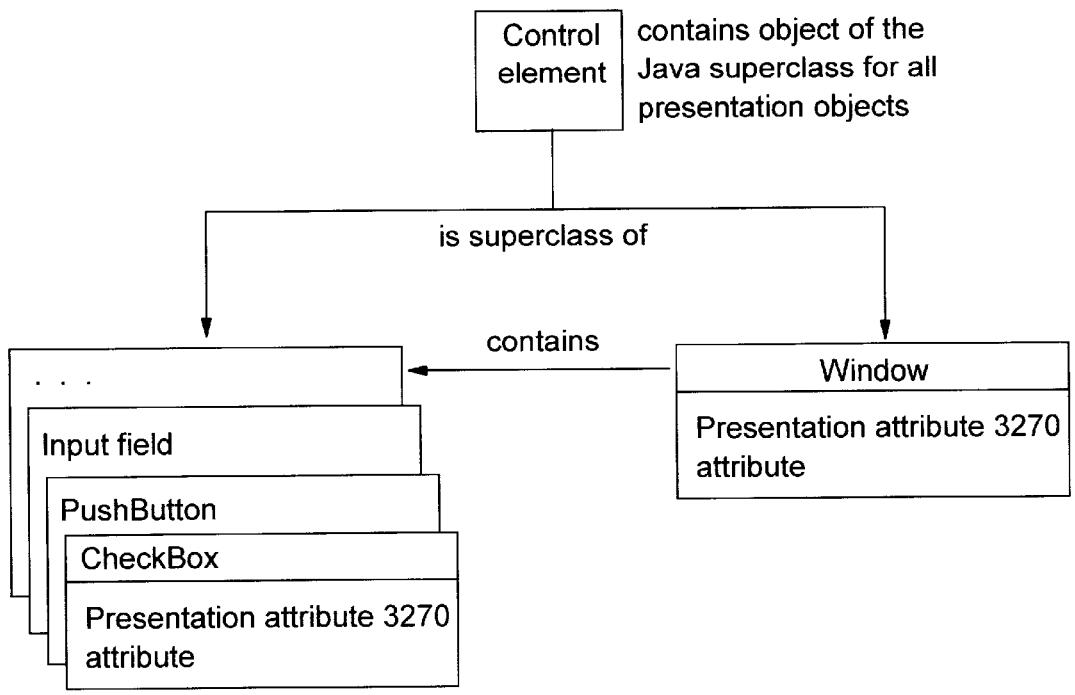

FIG. 5b shows a graphics user interface corresponding to FIG. 5a,

FIG. 6 shows a JAVA class library which is a constituent of the present invention, FIG. 4b shows a mainframe computer and a PC (network station) which both have Internet access. The text-oriented application is installed on the mainframe computer and is run there. In addition, there is an emulation program which is preferably installed on the PC and is also run there. The emulation program is preferably a program written- in Java which can run under the control of the web browser. In addition, it is also possible to load the emulator through the Internet using the web browser.

Since the user is working with a graphics user interface instead of with a text-oriented user interface, a program is required which represents the graphics user interface and which communicates with the text-oriented application of the main-frame computer with the aid of the emulator.

The program is preferably written in a platform-independent programming language such as Java. The graphics user interface is preferably generated with the aid of a class library (Java class library). The class library takes over both the representation of the graphics interface and also the requisite communication with the emulator. Since the Java standard class library is not designed for communication with an emulator it requires communication extensions. The extensions consist, in essence, in transferring data or actions from the text-oriented application to an element of the graphics interface and vice versa. The standard classes for window and control elements available in the Java class library have to be extended:

- to change the properties of the control elements automatically and dynamically at run time.
- to mirror input and output elements between the fields of the text-oriented application and the elements of the PC window in both directions.
- to mirror user actions in the PC window, e.g. pressing a button, to corresponding actions in the text-oriented application.

This extended class library can be employed to produce a graphics user interface quickly and simply for any text-oriented mask.

The graphics user interface thus produced can be stored on a server in the Internet and be made accessible to certain user groups free or for a charge. For this, the user can download the user interface produced to the working memory of his PC and run it from there. This has the advantage that changes to the graphics interface only have to be made on the server. This obviates distribution of amended software to numerous PCs.

A further advantage of the present invention resides in the fact that the programming of the graphics user interface is so simple that the code can be generated automatically if a PC window has been defined by means of a graphics tool which permits access to the window definitions through a programmed interface.

FIG. 4c likewise shows a mainframe computer and a PC (network station) both of which have access to an Intranet. The comments to FIG. 4b apply accordingly.

FIG. 5a and FIG. 5b show an example of a preferred embodiment of the present invention, how a text-oriented mask is represented in a graphics user interface.

FIG. 5a shows a text-oriented mask. FIG. 5b shows the graphics user interface on the PC which replaces the-text-oriented mask on the user side. In this, the mask title part of the PC window, the field "Input 1" becomes a PC input field, the field "Input 2" becomes a checkbox (Yes/No decision by mouse click) and the description of the three function keys in the screen mask become pushbuttons (initiation of an action by mouse click).

The extended class library mentioned in the description to FIG. 4b/c provides classes and functions which bare optimised for the desired behaviour.

They are built, for example, on the standard classes present in Java. FIG. 6 shows the class hierarchy, which contains only the relevant elements for this embodiment.

The management of any desired control element is taken over by the control class. This contains presentation-specific attributes such as font, colour, text or position of the elements in the window. In addition, it takes care of the transfer of 3270 data from a field in the screen mask into the corresponding element and vice versa. The control class contains the following methods:

| | |
|---|---|
| setValue | sets the value (content) for an element |
| get Value | supplies the value for an element |
| showValue | shows the current value of the element |
| setFontColor | sets the font and colour for an element |
| setMappingParameter | sets all parameters required to transfer the 3270 data into the value of the control element and vice versa |
| mapWindow2Host | transfers the value of the element into the 3270 data |
| mapHost2Window | transfers 3270 data into the value of the element |
| setMapKeySequence | required for action elements such as buttons and menus. Gives the key combination which must be entered at the 3270 terminal if a button or menu is selected. |

Specific elements, such as, for example, input field, PushButton and CheckBox are then inherited from this class. In this class the methods of the top class are partially overwritten, e.g. the showValue method must be implemented specifically for each control element.

There is a class Window for the management of the elements in a window. This too is a sub-class of Control and again contains a list of objects in the class Control. It initialises the control elements, manages the layout and triggers the imaging process between the PC values and the values from the 3270 data for the individual elements. Window contains the following additional methods:

| | |
|---|---|
| addEntryField | inserts an entry field in the window |
| add PushButton | inserts a button into the window |
| addCheckBox | inserts a checkbox into the window |
| initControls | This function is overwritten by the application developer. It is called to insert all elements in the window and for initialisation. |

In order to make the code available for a PC window, the application developer must define a class which is derived from Window, such as, for example, class MyWindow extends window The application developer of Window and hence also of MyWindow sets Window title, Layout and other presentation attributes for the window. Within this class the method initcontrol must be overwritten, in order to define the elements "Input 1", "Input 2" and the buttons, i.e. initControl must contain the following code:

Control control control=addEntryfield control=addCheckBox control=addPushButton

In order to make the individual elements also the relevant definitions for those of the 3270 data, the code appears as follows:

control=addEntryfield control.setMappingParameter control=addCheckBox control.setMappingParameter control=addPushButton control.setMapKeySequence Finally the method showWindow is called to signal that all elements have been defined and the window can be imaged. From this point the whole of the management of the window in respect of construction and behaviour is taken over by the class library.

If the PC window was defined by a tool which permits access to the window definition through a programmed interface, the code can be automatically generated. In the case of a window definition produced by a face-lifting tool, all attributes relevant to the 3270 data can be used for generating the code.

For the method described in FIG. 5a/b for generating a graphics user interface, the code appears in detail as follows:

```
// ----------------------------------------
// -----------CLASS MyWindow --------------
// ----------------------------------------
class MyWindow extends window
    public    MyWindow ( )            // Constructor
        super   (640,                  // Width in pixels
                 410,                  // Height in pixels
                 "title",              // Title text
                 true)                 // Window size can be changed?
    public void initControls ( )
    Control   controlElement;
    char      fillSymbol [ ];          // Fill symbol for 3270 fields
    int       positions [ ];           // 3270 field positions
    int       length3270;              // Length of 3270 field
    String    valuePC [ ];             // PC value of the 3270 <-> PC
                                          value representations.
    String    value3270 [ ];           // 3270 value of the 3270 <-> PC
                                          value representations
// generate Entryfield
controlElement = addEntryField(
    "Input 1",                         // Text
    10,                                // Length of PC value
    3,3,                               // x,y coordinates
    3,1,                               // Width, height
    " ",                               // Initial value
    false,                             // Control element has the focus?
    Control.READWRITE) ;               // Input/output or protected
fillSymbol      = new char [1];        // Set up fill symbol
fillSymbol [0]  = ' ';                 // Set fill symbol
positions       = new int [1];         // Set up 3270 field positions
positions [0]   = 190;                 // set 3270 field position
controlElement.setMappingParameters (
    1,                                 // Number of 3270 field positions
    positions,                         // 3270 field positions set
    1,                                 // Number of fill symbols
    fillSymbol,                        // Fill symbol set
    false,                             // 3270 field gets the focus?
    LEFT,                              // Positioning of the value in
                                          the 3270 field
    false) ;                           // Overwrite field boundaries
                                          (3270 attribute bytes)?
// generate CheckBox
controlElement=addCheckBox ("Checkbox",
    "Input 2",                         // Text
    1,                                 // Length of PC value
    3,5,                               // x,y coordinates
    3,1,                               // Width, height
    "1",                               // Initial value
    false) ;                           // Control element has the focus?
fillSymbol      = new char [1];        // Set up fill symbol
fillSymbol [0]  = ' ';                 // Set fill symbol
positions       = new int [1];         // Set up 3270 field positions
positions [0]   = 270;                 // set 3270 field position
valuePC         = new string [2]       // Set up representation PC
                                          value of the 3270 <=> PC
                                          value
valuePC [0]     = "0";                 // Set PC value of the 3270 <=>
                                          PC value representation
valuePC [1]     = "1";
value3270       = new string [2]       // Set up 3270 value of the
                                          3270 <=> PC value represen-
                                          tation
value3270 [0]   = "No";                // Set 3270 value of the 3270
                                          <=> PC value representation
value 3270 [1]  = "YES";
length3270      = 4;                   // Set length of 3270 field
```

-continued

```
controlElement.setMappingParameters (
    1,                                 // Number of 3270 field positions
    positions,                         // 3270 field positions set
    2,                                 // Number of 3270 <=> PC value
                                          representations
    valuePC,                           // PC value of the 3270 <=> PC
                                          value representation
    value3270,                         // 3270 value of the 3270 <=> PC
                                          value representation
    length3270;                        // Length of the 3270 field
    0,                                 // Number of fill symbols
    fillSymbol,                        // Fill symbol set
    false,                             // 3270 field gets the focus?
    LEFT,                              // Positioning of the value in
                                          the 3270 field
    false) ;                           // Overwrite field boundaries
                                          (3270 attribute bytes)?
// generate PushButtons
controlElement=addPushButton (
    7,3,                               // x,y coordinates
    2,1,                               // Width, height
    "OK",                              // Text
    true                               // Button is preselected?
controlElement.setMapKeySequence (
    "@ENTER") ;                        //3270 function key
controlElement=addPushButton (
    3,7,                               // x,y coordinates
    2,1,                               // Width, height
    "Cancel",                          // Text
    false                              // Button is preselected?
    ) ;
controlElement.setMapKeySequence (
    "@PF3") ;                          //3270 function key
controlElement=addPushButton (
    6,7,                               // x,y coordinates
    3,1,                               // Width, height
    "Help",                            // Text
    false                              // Button is preselected?
    ) ;
controlElement.setMapKeySequence (
    "@PF1") ;                          //3270 function key
showWindow( ) ;                        // Window takes over controls
```

The present invention therefore describes a process for the mapping of a text oriented user interface of a program to a graphics user interface without the necessity of changing the program itself, where the graphics user interface can be started from any network environment. A prerequisite for this is that the user interface to be created is written in a platform-independent language, such as Java. Here the process of the invention serves as a development tool based on standard Java classes and is extended by the classes required for communication between text-oriented and graphics user interface. Because of its platform-independent programming this development tool can be installed on any server within a network. Using this development tool, the application developer can quickly and easily develop a corresponding graphics mask for any text-oriented mask of an application with little cost in programming.

The graphics masks thus produced can be stored on a server in the Internet and made available either free or for a charge to specific user groups. In this case the user can download the maskproduced to the working memory of his PC and run it from there. This has the advantage that changes to the graphics interface only require to be made on the server. This eliminates distribution of the software for the changed application to numerous PCs.

A further advantage of the present invention resides in the fact that the programming of the graphics user interface is so simple that the code can even be generated automatically, if a PC window has been defined by means of a graphics tool which permits access to window definitions through a programmed interface.

What is claimed is:

1. A method for mapping a text-oriented user interface to a gaphics user interface, comprising:

automatically altering properties of control elements of a standard Java class library based on changes in the text-oriented user interface so as to dynamically react to changes in the text-oriented user interface to provide an extended Java class library;

generating a gaphics user interface corresponding to the text-oriented user interface utilizing the extended Java class library so that the graphics user interface automatically reflects the changes in the text-oriented user interface;

wherein the step of automatically altering properties of control elements of a standard Java class library comprises the steps of:

accessing a window definition associated with the text-oriented user interface so as to determine attributes associated with the window definition; and overwriting portions of the standard Java class library utilizing the determined attributes so as to provide the extended Java class library based on the determined attributes.

2. A method according to claim 1, wherein the step of accessing comprises the step of utilizing a face-lifting tool to determine attributes associated with the window.

3. A method according to claim 1, wherein the step of accessing comprises accessing a window definition utilizing a programming interface of an application which provides the window definition.

4. A system for mapping a text-oriented user interface to a graphics user interface, comprising:

means for automatically altering properties of control elements of a standard Java class library based on changes in the text-oriented user interface so as to dynamically react to changes in the text-oriented user interface to provide an extended Java class library;

means for generating a graphics user interface corresponding to the text-oriented user interface utilizing the extended Java class library so that the graphics user interface automatically reflects the changes in the text-oriented user interface;

wherein the means for automatically altering properties of control elements of a standard Java class library comprises:

means for accessing a window definition associated with the text-oriented user interface so as to determine attributes associated with the window definition; and means for overwriting portions of the standard Java class library utilizing the determined attributes so as to provide the extended Java class library based on the determined attributes.

5. A system according to claim 4, wherein the means for accessing comprises a face-lifting tool to determine attributes associated with the window.

6. A system according to claim 4, wherein the means for accessing comprises means for accessing a window definition utilizing a programming interface of an application which provides the window definition.

7. A computer program product stored in a computer readable medium for mapping a text-oriented user interface to a graphics user interface, comprising:

computer readable pro=am code for automatically altering properties of control elements of a standard Java class library based on changes in the text-oriented user interface so as to dynamically react to changes in the text-oriented user interface to provide an extended Java class library;

computer readable program code for generating a graphics user interface corresponding to the text-oriented user interface utilizing the extended Java class library so that the graphics user interface automatically reflects the changes in the text-oriented user interface;

wherein the computer readable program code for automatically altering properties of control elements of a standard Java class library comprises:

computer readable program code for accessing a window definition associated with the text-oriented user interface so as to determine attributes associated with the window definition; and computer readable program code for overwriting portions of the standard Java class library utilizing the determined attributes so as to provide the extended Java class library based on the determined attributes.

8. A computer program product according to claim 7, the computer readable program code for accessing comprises computer readable program code for utilizing a face-lifting tool to determine attributes associated with the window.

9. A computer program product according to claim 7, wherein the computer readable program code for accessing comprises computer readable program code for accessing a window definition utilizing a programming interface of an application which provides the window definition.

* * * * *